Oct. 11, 1932.   J. D. LANGDON   1,881,703
WHEEL AND GEAR PULLER
Filed April 14, 1930

INVENTOR.
BY  J. D. Langdon

Patented Oct. 11, 1932

1,881,703

UNITED STATES PATENT OFFICE

JESSE D. LANGDON, OF LOS ANGELES COUNTY, CALIFORNIA

WHEEL AND GEAR PULLER

Application filed April 14, 1930. Serial No. 444,176.

My invention relates to wheel or gear pullers for the purpose of removing wheels, gears, or other objects, from a shaft upon which said objects may be mounted.

The primary object in my invention is to provide a wheel or gear puller adapted to go into close places.

Another object in my invention is to provide a wheel or gear puller adapted to mount a multiplicity of traction arms according to the purpose and condition or contingencies of its use.

Another object is to provide a wheel and gear puller adapted to retain the traction arms in operative position and prevent said arms from falling away from their work when being applied.

Another object in my invention is to provide traction arms circumferentially in relation to one another.

A still further object is to provide a wheel or gear puller having means to force and hold the traction arms concentrically towards one another.

Other and further objects of my invention will appear as the descriptive matter proceeds.

It is specifically understood that the following drawing is for the purpose of illustration only and my invention may be changed within the limits of what is claimed.

Figure 1:
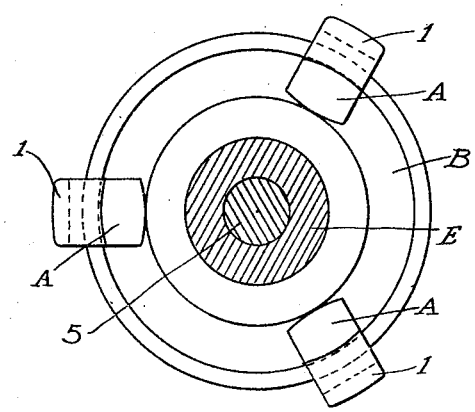
Fig. 1 is a view, partly in horizontal cross section, between retaining discs.
Figure 3:
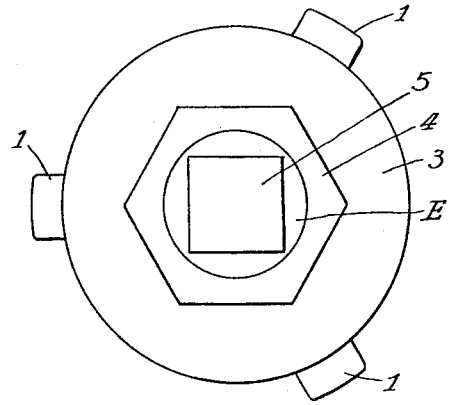
Fig. 3 is a top view.
Figure 2:
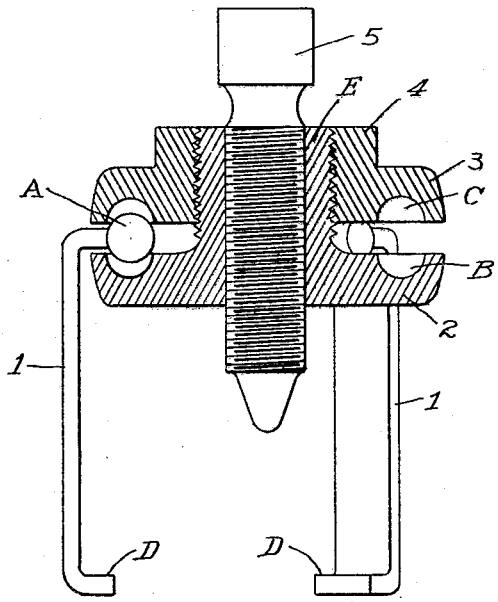
Fig. 2 is a view, partly in transverse section, showing arrangement of retaining discs, traction arms and jack screw.
Figure 4:
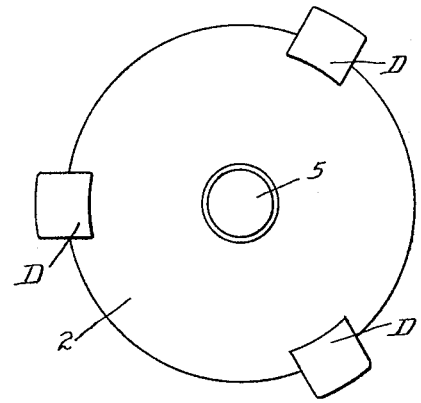
Fig. 4 is a bottom view.

The construction of my invention comprises traction arms —1—, having suitable pivotal portions —A— at one extremity and hooks —D— at the other extremity. Pivotal portions —A— ride in grooves —B— in suspension disc —2— which has a threaded extension —E—, upon which is mounted clamp and retaining disc —3— having a set nut —4— upon the upper side thereof.

A jack screw —5— is threaded through extension —E— of disc —2—.

The operation of my invention is as follows:

Traction arms —1— are attached where convenient to wheel gear, or other objects, which it is desired to remove from a shaft, (disc —3— being previously backed away from disc —2— to allow free movements of pivotal portions —A—) disc —2— being moved on extension —E— by means of set nut —4— to allow pivotal portions —A— to move freely in groove —C— and groove —B— so traction arms —1— may be swung apart or manipulated to fit the wheel, gear or other object which is to be removed.

After attaching hooks —D— to the object to be removed, disc —3— is then forced against the pivotal portions —A— forcing hooks —D— convergently against their attachment. The discs —2— and —3— may be set sufficiently close to one another so that friction will hold them in any position in which they may be set in order to attach them, so that traction arms —1— will not fall away from their work.

All traction arms —1— are held at one time by the same clamping or frictional means, namely, between discs —2— and —3—, so that no traction arm needs to be held by the operator at any time while the puller is being applied except when the object to be pulled is of irregular shape.

After discs —2— and —3— have been forced together to hold the puller in operative position by means of disc —3—, jack screw —5— is forced against the center of the shaft upon which the wheel, gear or other object is mounted, thus bringing a tension on traction arms —1— to move the wheel, gear or other object upon the shaft on which said object may be mounted.

Any number of traction arms —1— permissible according to the size of the discs —2— and —3— may be placed between the grooves —B— and —C— when more traction arms, which may be variable shapes and lengths to suit the contingencies of their work, are required.

Having thus described my invention, and that which is new, I claim:

1. A gear and wheel puller comprising traction arms, held in operative position by and between the opposed faces of two discs, a jack screw through the center of said discs without the use of slots, said traction arms movable in a circumferential direction around the periphery of said discs, said discs adapted to move to and fro and rigidly clamp the pivotal ends of said traction arms.

2. A wheel and gear puller comprising traction arms, held in operative position solely by and between the opposed faces of superimposed discs, said discs adjustable to and from one another to exert a clamping effect against said traction arms.

3. A wheel and gear puller comprising traction arms, held in operative position solely by and between superimposed discs, the faces of said superimposed discs comprising the retaining means for said traction arms.

4. A wheel and gear puller comprising traction arms held in operative position solely by and between the opposed faces of superimposed discs, said discs adapted to move to and from one another and comprising means to force the terminal ends of said traction arms toward one another.

5. A wheel and gear puller comprising traction arms held in operative position solely by and between the faces of one retaining member superimposed upon another retaining member, a jack screw thru the center of said retaining members.

6. A wheel and gear puller comprising traction arms held in operative position solely by and between the faces of one retaining member superimposed upon another retaining member, recesses between the faces of said superimposed members, said recesses adapted to retain said traction arms.

7. A wheel and gear puller comprising traction arms held in operative position solely by and between the faces of one retaining member superimposed upon another retaining member, said retaining members adjustably mounted and adapted to be adjusted toward and away from one another, recesses between the faces of said superimposed members, said recesses adapted to retain said traction arms.

JESSE D. LANGDON.